United States Patent
Gunara et al.

(10) Patent No.: US 7,310,798 B1
(45) Date of Patent: Dec. 18, 2007

(54) SIMULATOR TOOL FOR TESTING SOFTWARE IN DEVELOPMENT PROCESS

(75) Inventors: Alfredo Edwin Gunara, Overland Park, KS (US); Shiming Zhan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 618 days.

(21) Appl. No.: 10/643,328

(22) Filed: Aug. 18, 2003

Related U.S. Application Data

(60) Provisional application No. 60/404,824, filed on Aug. 19, 2002.

(51) Int. Cl.
 *G06F 9/44* (2006.01)
(52) U.S. Cl. ............... 717/135; 717/124; 717/125; 717/126
(58) Field of Classification Search ............... 717/143, 717/101, 128, 135, 124, 125, 126; 714/38–724; 710/107; 709/224; 707/10
 See application file for complete search history.

(56) References Cited

U.S. PATENT DOCUMENTS

| | | | | |
|---|---|---|---|---|
| 5,701,488 A | * | 12/1997 | Mulchandani et al. | 717/128 |
| 5,732,213 A | * | 3/1998 | Gessel et al. | 709/224 |
| 5,920,722 A | | 7/1999 | Damron | 395/706 |
| 6,158,031 A | * | 12/2000 | Mack et al. | 714/724 |
| 6,249,886 B1 | | 6/2001 | Kalkunte | 714/47 |
| 6,449,739 B1 | | 9/2002 | Landan | 714/47 |
| 2003/0229740 A1 | * | 12/2003 | Maly et al. | 710/107 |
| 2004/0010781 A1 | * | 1/2004 | Maly et al. | 717/143 |
| 2005/0160321 A1 | * | 7/2005 | Cleaveland et al. | 714/38 |
| 2006/0047665 A1 | * | 3/2006 | Neil | 707/10 |
| 2006/0195816 A1 | * | 8/2006 | Grandcolas et al. | 717/101 |

OTHER PUBLICATIONS

Balagurunathan Balasubramanian, et al., *Method and Software for Testing and Performance Monitoring*, filed May 31, 2001, U.S. Appl. No. 09/871,304, Specification (43 pgs.) and Drawings (12 sheets).

* cited by examiner

*Primary Examiner*—Meng-Al T. An
*Assistant Examiner*—Mark P. Francis

(57) ABSTRACT

A simulator tool for testing software is provided. The simulator tool includes a simulator to test the software, an interface to promote communication between the simulator and the software, a message including a component utilized by the simulator to promote testing of the software, and a test controller operable to communicate the message to the simulator, such that the message is utilized by the simulator to test the software. A method for testing software and applications is also provided.

35 Claims, 4 Drawing Sheets

SIMULATOR TOOL FOR TESTING SOFTWARE IN DEVELOPMENT PROCESS

CROSS-REFERENCE TO RELATED APPLICATIONS

This application claims priority to U.S. Provisional Patent Application Ser. No. 60/404,824 entitled Enterprise Architecture Development Process filed Aug. 19, 2002, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The field of the present invention includes computer software. More particularly, embodiments of the present invention are concerned with computer software testing.

BACKGROUND OF THE INVENTION

Computer software testing presents a variety of difficulties in the software development cycle. Software testing may need to test the ability of the software to handle multiple inputs at the same time. For example, it is not sufficient to verify that a web server can handle a browser hit from a single user at a time: web servers hosting a popular web site may receive hundreds of browser hits more or less at the same time. This kind of testing may be referred to as concurrent testing.

Software testing may need to test the ability of the software to handle a high volume of actions. For example, it is not sufficient to verify that a long distance telephone switch can route a single phone call at a time: it may be required to handle 100,000 call originations per hour. Testing which verifies the ability of software to handle a volume of actions may be referred to as stress testing or load testing.

As a software product suite matures it is extended and new features and functionality are built onto or added to the previous software. When testing the new extensions the new functionality must be tested, but it is important to retest the old functionality to assure that the quality of the old product has not regressed. Testing directed to assuring the old functionality has not been degraded may be referred to as regression testing. Regression testing may be simply a matter or rerunning the tests used to test the functionality of previous releases.

Software releases or software products may include multiple pieces of software—software components, software modules, or software applications—which cooperate to achieve the goals for the software release or product. The difference between software components, software modules, and software applications is not distinct and is a question of granularity, a question of how big a chunk of software is the subject of discussion. In the description which follows the term software component or component is usually employed, but bear in mind that it is meant that this term comprehend all three of these terms, unless otherwise noted. Sometimes, to insist on this inclusiveness all three terms are employed.

Independent software developers or computer programmers—or separate teams of developers—may be assigned to develop each distinct component or module or application of the software product. Typically, the earlier in the software development cycle that one can find and fix errors in software, the less expensive these errors are to fix. It may be desirable to test a software component before all the other cooperating software components are completely developed and even before the software component to be tested itself is completely developed.

Sometimes code is built into a software component solely to support the testing of other components while the software component is still being developed. This code may later be completely deleted from the software component when full functionality is developed, or it may be left in place but disabled in some manner. Development of this testing code comprises, in some sense, wasted effort since it consumes development time and does not contribute directly to the finished product. Such test code may be called "throw away" code because it may never be used again after the initial development stage. Additionally, such test code may not support regression testing in future releases of the software product.

Software may be tested by sending inputs to and receiving outputs from the software under test (SUT). Sometimes software testing is accomplished by having developers take actions at their computer terminals to cause inputs to be sent to and to receive the outputs from the SUT, in a manual rather than an automated enactment of the planned software execution. This kind of testing may tie up the resources of several developers. Additionally, this kind of testing may interfere with normal daily operations, thus forcing the developers to work late or unaccustomed hours to perform this kind of testing. This kind of manual software testing may not support stress testing or concurrent testing needs.

Sometimes the testing described above may be conceptualized by the computer program developers themselves and used in their early testing. These testing concepts may pass on to a separate team of software testers who may not be as familiar with the technologies employed by the developers in their early testing. Hence, there may be a difficult learning curve for the software testers to climb before they are able to successfully employ the testing concepts used by the developers.

SUMMARY OF THE INVENTION

The present embodiment provides a simulator tool for testing software components, modules, and applications including a simulator to test the software, an interface to promote communication between the simulator and the software, a message including a component utilized by the simulator to promote testing of the software, and a test controller operable to communicate the message to the simulator, wherein the message is utilized by the simulator to test the software.

In one embodiment a method of testing software components, modules, and applications is provided that comprises providing software under test; providing a script to a test controller; communicating the script, via the test controller, to a simulator simulating a software component, module, or application that communicates with the software under test; and testing the software under test by the simulator performing the script.

In one embodiment a system for testing software components, modules, and applications is provided that includes a test scenario operable to maintain a message, a simulator to simulate a software component, module, or application in communication with the software to be tested, a test controller operable to obtain the message from the test scenario and communicate at least a portion of the message to the simulator, and a tool to develop at least a portion of the message and provide at least a portion of the message to the test scenario.

These and other features and advantages will be more clearly understood from the following detailed description taken in conjunction with the accompanying drawings and claims. It is important to note that the drawings are not intended to represent the only form of the invention.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Figure 1:
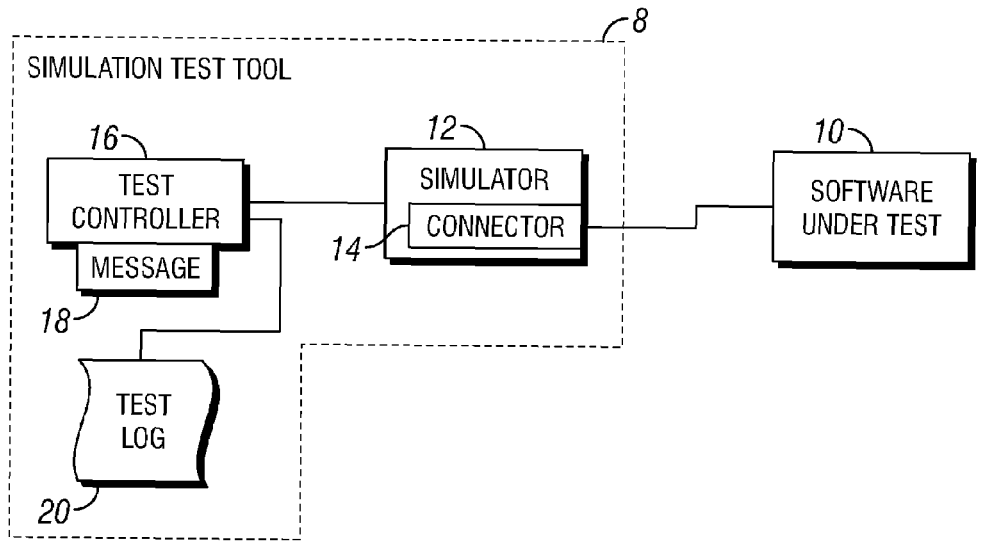
FIG. 1 is a block diagram, according to one embodiment, of architecture for implementing a simulation test tool of the present disclosure.

Turning now to FIG. 1 a block diagram of one embodiment a simulation test tool 8 is depicted. A software under test (SUT) 10 is being tested. The SUT 10 may be a software component, a software module, or a software application. A simulator 12 communicates with the SUT 10 via a connector 14. The simulator 12 is controlled by a test controller 16 which sends the simulator 12 a message 18 that specifies the communication, interaction, or operation the simulator 12 carries out with the software 10. The simulator 12 reports the results of this interaction to the test controller 16. The test controller 16 records the results of the interaction between the simulator 12 and the SUT 10 in a test log 20. The test log 20 may be examined to determine the result of the test. The test controller 16 and the simulator 12 may execute on one general purpose computer system and the SUT 10 may execute on a second general purpose computer system. General purpose computer systems are discussed in more detail hereinafter.

In this embodiment the simulator 12 takes the place of some software component, module, or application—referred to herein as componentX for ease of understanding—with which the SUT 10 communicates or interacts. The simulator 12 does not necessarily implement the complex functionality of the missing componentX, but instead the simulator 12 simply supports the communication interface, through connector 14 built into or utilized by the simulator 12, between the SUT 10 and componentX. Under control of the test controller 16, the simulator 12 may send or receive a sequence of messages 18, and report back the result of each interaction with the SUT 10 to the test controller 16.

Although only message 18 is illustrated in the present embodiment, is should be appreciated that the actual content and effect of message 18 between the test controller 16 and the simulator 12 and between the simulator 12 and the SUT 10 differs considerably. For example, when the test controller 18 sends the message 18 to the simulator 12, the message 18 may include instructions for the simulator 12, but the message 18 sent between the simulator 12 and SUT 10 may include testing information or other instructions for the SUT 10. The message 18 may be an XML message, a copybook-compliant message or a Java object when communicated between the simulator 12 and the SUT 10. The content of the message 18 exchanged between the simulator 12 and the test controller 16 may consist of, for example, only a test script identification identifying a script that is to be executed by the simulator 12.

The connector 14 provides the functionality of communication with the SUT 10 according to some specific technology or protocol. For example, the connector 14 may support Message Broker communication, Information Broker communication, Java messaging service (JMS), IBM MQSeries communication, UNIX socket communication, file system communication (perhaps using the file transfer protocol (FTP)), database management system (DBMS) communication, Vitria BusinessWare communication, common object request broker architecture (CORBA) communication, for example. By delegating detailed knowledge of the communication technology to the connector 14 the problem of developing software for this intercommunication can be solved once and reused many times. The simulator 12 is simply built with the appropriate connector 14 needed to communicate with the SUT 10. In some embodiments the simulator 12 may be built with multiple connectors 14—each connector 14 supporting a different communication mechanism—to support testing the different communication modes between the SUT 10 and the unavailable software—such as componentX—which the simulator 12 takes the place of.

The message 18 may be structured to include a directional component indicating whether the communication is outbound from the simulator 12 (hence the simulator 12 is to send a message to the SUT 10) or is inbound to the simulator 12 (hence, the simulator 12 is to receive a message from the SUT 10). The message 18 may be structured to include a data component. This data component may specify the value of data to be sent from the simulator 12 to the SUT 10 in an outbound direction or may specify the expected value of data to be sent from the SUT 10 to the simulator 12 in an inbound direction. The data may specify the communication mechanism the simulator 12 is to employ and hence what connector 14 to employ when communicating with the SUT 10.

In the present embodiment, the message 18 communicated between the test controller 16 and the simulator 12 is a test script that includes information or a message within the test script. In this embodiment, the message 18 or test script includes the directional component. The test controller 16, using the message 18 or test script, instructs the simulator 12 to execute a particular test script by passing, for example, a test script ID. The simulator 12 then loads the test script and sends the information to SUT 10, via the appropriate connector 14.

As a simple illustration, suppose SUT 10 squares numbers which are sent to it. The test controller 16 sends a message 18 with contents {outbound, 3} to the simulator 12. The simulator 12 communicates the number '3' to the SUT 10 via the connector 14. The simulator 12 reports to the test controller that it has sent the number '3' to the SUT 10. The test controller 16 records this report in the test log 20. The test controller 16 sends a message 18 with contents {inbound, 9} to the simulator 12. This indicates that the simulator 12 should receive a communication from the SUT 10 and the communication should contain the value 9 (the square of the number 3 earlier presented to the SUT 10).

The simulator 12 readies itself to receive communication from the SUT 10. The SUT 10 sends the number '9' to the simulator 12 via the connector 14. The simulator 12 compares the received number '9' against the expected value '9' sent to it by the test controller 16. The simulator 12 reports to the test controller 16 that it has received the expected value from the SUT 10. The test controller records this report in the test log 20. Note that the notation "{inbound, value}" is arbitrary and used for convenience here; it is not meant to describe the format of message communication between the test controller 16 and the simulator 12. It is to be appreciated that this example is provided solely for illustrative purposes and that actual messages 18 and data may be significantly more complicated.

If the SUT 10 is in communication with more than one other componentX as described above, one simulator 12 may not suffice for testing the SUT 10. Suppose that communication from a first componentX directed to the SUT 10 induces the SUT 10 to send a communication to a second componentY, in this case one simulator 12 does not suffice.

Figure 2:
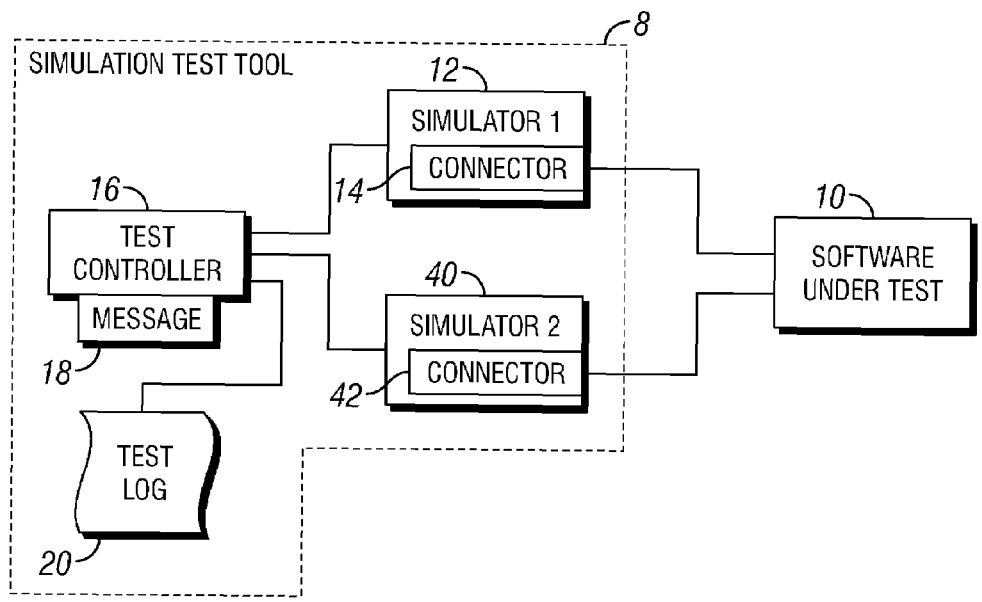
FIG. 2 is a block diagram, according to another embodiment, of software architecture for implementing the simulation test tool of the present disclosure.

Turning now to FIG. 2, a block diagram of another embodiment of the simulation test tool 8 is depicted. Here again the SUT 10 is being tested. A first simulator 12 communicates with the SUT 10 via the connector 14. A second simulator 40 communicates with the SUT 10 via a connector 42. The two simulators, the first simulator 12 and the second simulator 42, are substantially the same. Both the first simulator 12 and the second simulator 40 are controlled by the test controller 16 which sends the simulators 12 and 40 messages 18 that specify the interactions the simulators 12 and 40 are to carry out with the SUT 10. The test controller 16 records the results of the interaction between the simulator 12 and 40 and the SUT 10.

The connectors 14 and 42 may support the same communication technology or they may support different technologies. While the simulators 12 and 40 are shown as having each only a single connector, in some embodiments one or both of the simulators 12 and 40 may have multiple connectors.

Testing software typically involves conducting a number of tests each of which differs from the others in perhaps small ways. Each of these tests may be referred to as a test case. A test case in the simulation test tool 8 environment may be defined by a sequence of messages 18 that the test controller 16 handles one at a time, one after another, until the complete sequence of messages 18 has been traversed. This sequence of messages may be referred to as a message queue. A message queue defines a single test run or test case or test suite.

In software testing it may be desired to test the SUT 10 while it is conducting multiple independent streams of interactions. This may be accomplished by concurrent testing. In one embodiment concurrent testing is accomplished by having the test controller 16 sequence two or more independent message queues in independent concurrent processing threads.

Figures 3, 3A:
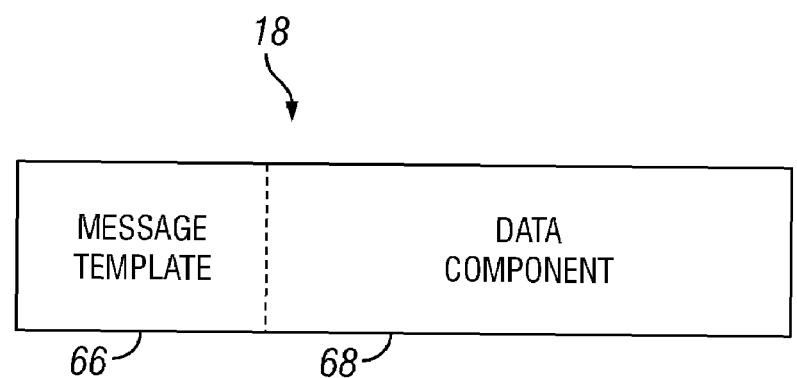
FIG. 3 depicts an exemplary test suite composed of several message queues each comprising several individual messages.
FIG. 3A depicts a message structure in accordance with one embodiment of the present disclosure.

Turning to FIG. 3 an exemplary concurrent test case or test suite is depicted. An indefinite number n of message queues Q1 60, Q2 62, through Qn 64 are depicted. Each message queue comprises an indefinite number of messages. Message queue Q1 60 comprises a number k messages M1. Message queue Q2 62 comprises a number i messages M2. Message queue Qn 64 comprises a number g messages Mn. When the test controller 16 executes this concurrent test case it will spawn a number n processing threads. Each of these n test controller threads will sequence through one of the n message queues 60, 62, and 64. The result is that interactions or operations are presented by the simulators 12 to the SUT 10 not one at a time but perhaps several at roughly the same time.

The test controller threads send messages 18 to simulators 12 and 40 at their own pace. It need not be the case that the test controller thread handling Q2 62 send message $M2_2$ to a simulator 12 or 40 at the same time that the test controller thread handling Q1 60 sends message $M1_2$ to a simulator 12 or 40. If the intent of the test case requires that such messages 18 be synchronized, then thread synchronizing may be conducted between the test controller threads and may also be stipulated in the test case definition. The messages 18 may include delays, for example $M1_1$ and $M1_2$, thereby effecting a synchronized delay in transmitting the message 18 to the simulator 12 or, depending upon the test script, a delay in the simulators 12 acting on the message 18 and sending information to the SUT 10. Such capability allows the SUT 10 to be simultaneously tested from multiple simulators 12 sending varying, or perhaps the same, information to the SUT 10.

The message 18 may also be referred to as a test script. Note that this term is not intended to imply that any executable instruction is embedded in the message 18, though transmitting executable instructions is not prohibited. Also note that this term does not refer to a sequence of messages 18 but to a single message 18.

In one embodiment the message 18 comprises the following structure. A test operation ID indicates what operation is intended for this message 18. A simulator ID indicates what simulator is to act upon this message 18. An outbound indicator—either true or false—indicates if the message 18 is outbound or inbound. A message delay defines an optional delay before the simulator 12 replies. An expected data section defines the value to be compared by the simulator 12 against incoming communication from the SUT 10. An output data section defines the value that the simulator 12 sends to the SUT 10.

The message 18 may be articulated in eXtensible markup language (XML). An example XML articulation of a message 18 is:

```
<testScript id=". . . " version=". . . ">
  <testOperation id=". . . ">
    <testSimulatorId>. . . </testSimulatorId>
    <outbound>true</outbound>
    </expectedData>
    <outputData>
      <argumentData id=". . . ">
        . . .
      </argumentData>
    </outputData>
  </testOperation>
</testScript>
```

The several instances of ". . . " in the example above would be replaced by actual values. Note that the above example is provided solely to illustrate one method of articulating the message 18, but many other methods of articulating the message 18 will readily suggest themselves to one of ordinary skill in the art and are within the spirit and scope of the present invention. One skilled in the art will readily appreciate how XML or other syntaxes may be employed to articulate such messages 18.

In one embodiment the messages 18 may be classified into four different classes: asynchronous outbound messages 18, asynchronous inbound messages 18, synchronous outbound messages 18, and synchronous inbound messages 18.

An asynchronous outbound message 18 is used by the simulator 12 to send a communication to the SUT 10 asynchronously: that is, the simulator 12 does not wait for the SUT 10 to respond to its communication. An asynchronous outbound message 18 is distinguished from a synchronous outbound message 18 by having an empty expectedData field.

An asynchronous inbound message 18 is used by the simulator 12 to receive a communication from the SUT 10 asynchronously: that is, the simulator 12 is not waiting for the communication from the SUT 10. An asynchronous inbound message 18 is distinguished from a synchronous inbound message 18 by having an empty outboundData field.

A synchronous outbound message 18 is used by the simulator 12 to send a communication to the SUT 10 synchronously: that is, the simulator 12 waits for a response to its communication. A synchronous outbound message 18 is distinguished from an asynchronous outbound message 18 by having a valid expectedData field.

A synchronous inbound message 18 is used by the simulator 12 to receive a communication from the SUT 10 synchronously: that is, the simulator 12 responds to the communication from the SUT 10. A synchronous inbound message 18 is distinguished from an asynchronous inbound message 18 by having a valid outboundData field.

Turning now to FIG. 3A, in one embodiment the message 18 is comprised of a message template 66 component and a message data 68 component. The message data 68 component comprises the data portion of the message 18. The message template 66 component comprises the rest of the message 18. In this embodiment both the message template 66 and the message data 68 are stored in a file system. When the test controller 16 instructs a simulator 12 to do something, instead of sending the complete message 18 it sends only a message id. The simulator 12 looks up the message template 66 using the message id. Any data needed for the transaction is also looked up using information from the message template 66. The stored messages 18 may be accessed from the file system; the stored messages 18 may be loaded into the simulator 12 process memory; or the stored messages 18 may be accessed via an universal reference locator (URL).

In this embodiment the simulator 12 behavior for an outbound message 18 is different from the simulator 12 behavior for an inbound message 18. For an outbound message 18, the simulator 12 searches for the message template 66 using the supplied testScipt ID in the stored collection of messages 18. The simulator 12 looks up the output data of the located message template 66. The simulator 12 looks for an appropriate connector 14 by comparing the testOperation ID with the supported operations of each of the connectors 14 built into the simulator 12. If the connector 14 is found, the simulator 12 delegates the output data to the connector 14 for delivery to the SUT 10.

For an inbound message 18, the behavior is different because the SUT 10 does not know about testScript ID. When the simulator 12 receives an inbound communication from the SUT 10, the simulator 12 is passed an operation name and a business key (or primary key) which are obtained from the inbound communication by the connector 14. The simulator 12 compares the operation name and business key with the testOperation ID of each of the stored message templates 66 until it finds a match. If the testOperation ID is matched then the message data 68 associated with the message template 66 is looked up. This message data 68 is compared with the business key. If matched, then the output data of the message 18 is returned.

In the present embodiment, the simulator 12 is programmed to remain in a waiting mode and the test controller 16 issues a time-out exception. The test controller 16, and not the simulator 12, effects the execution ordering of the test scripts within the test suite. The test controller 16 processes the test scripts or messages 18, and based on the content of the test script, the test controller 16 determines whether it is an inbound or outbound test script. If the current test script is outbound, then the test controller 16 notifies the appropriate simulator 12 to execute the test script.

The test controller 16 may not know what the test script does or will do to the SUT 10. Where the message 18 or test script is inbound, the test controller 16 will automatically wait for the responsible simulator 12 to provide status. Since the test controller 16 goes to wait state on its own and is programmed for when to do time out, for example, 3 minutes after entering the wait state. During the wait time, test controller 16 monitors whether the response to the test script has been delivered by the particular simulator 12. If the response arrives, then the test controller 16 will get out from the wait state and proceed to the next test script. If the response does not arrive, then the test controller 16 will send a time out exception, which essentially terminates the execution queue in which the test script is residing, but not the entire test suite since a test suite can have multiple execution queues.

In one embodiment, the simulator 12 is provided with limited functionality to compare or otherwise manipulate and/or analyze the messages 18 send to and received from the SUT 10 and such functionality is provided by the test controller 16 with the simulator 12 having a passive communication role. In other embodiments, the simulator 12 is provided with functionality to compare or otherwise manipulate and/or analyze the messages 18, while in yet other embodiments, the test controller 16 and simulator 12 are both provided with such functionality or together include such functionality.

Figure 4:
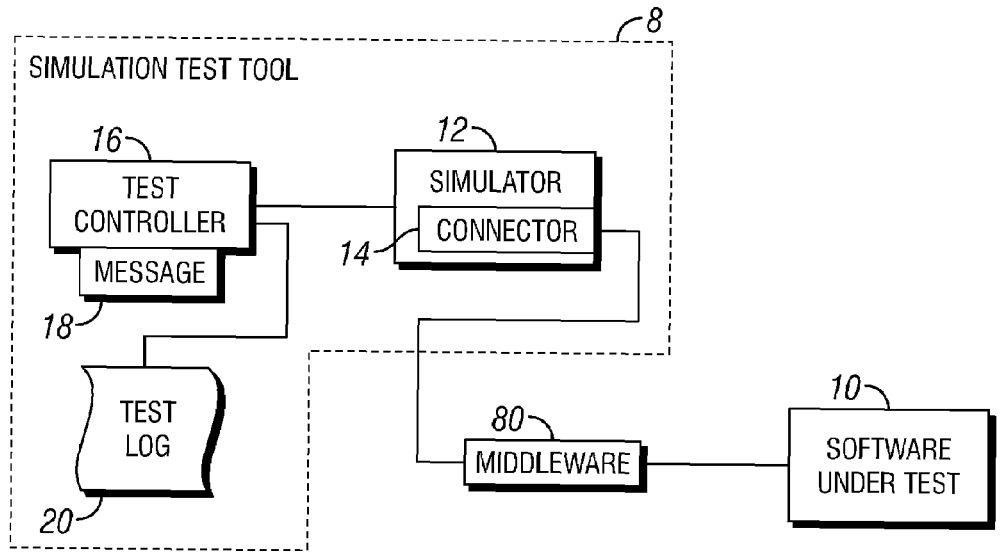
FIG. 4 is a block diagram of another software architecture for implementing the simulation test tool, according to another embodiment of the present disclosure.

Sometimes software communicates with other software via an intermediary middleware software package. Some examples of such middleware may include IBM MQSeries, Vitria BusinessWare, Message Broker, etc. In one embodiment, when the SUT 10 is designed to communicate with other software components using middleware, the actual middleware is employed in testing the SUT 10. Turning now to FIG. 4, the SUT 10 is shown in communication with the simulator 12 via a middleware 80. Note that the connector 14 will be selected to match up with the specific middleware 80 employed. The rest of the simulation test tool 8 architecture remains unchanged. The middleware 80 may execute on the same general purpose computer system that the SUT 10 executes upon, or it may execute upon the general purpose computer system that the simulation test tool 8 executes on. General purpose computer systems are discussed in detail hereinafter.

The embodiment depicted in FIG. 1 contains a single simulator 12. The embodiment depicted in FIG. 2 contains two simulators 12 and 40. Other embodiments may contain a greater number of simulators. There is no intrinsic limit upon the number of simulators 12 which may be included in a simulation test tool 8. In practice the number of simulators 12 is determined by how many external software components or software modules or software applications that the SUT 10 communicates with to be adequately tested.

Figure 5:
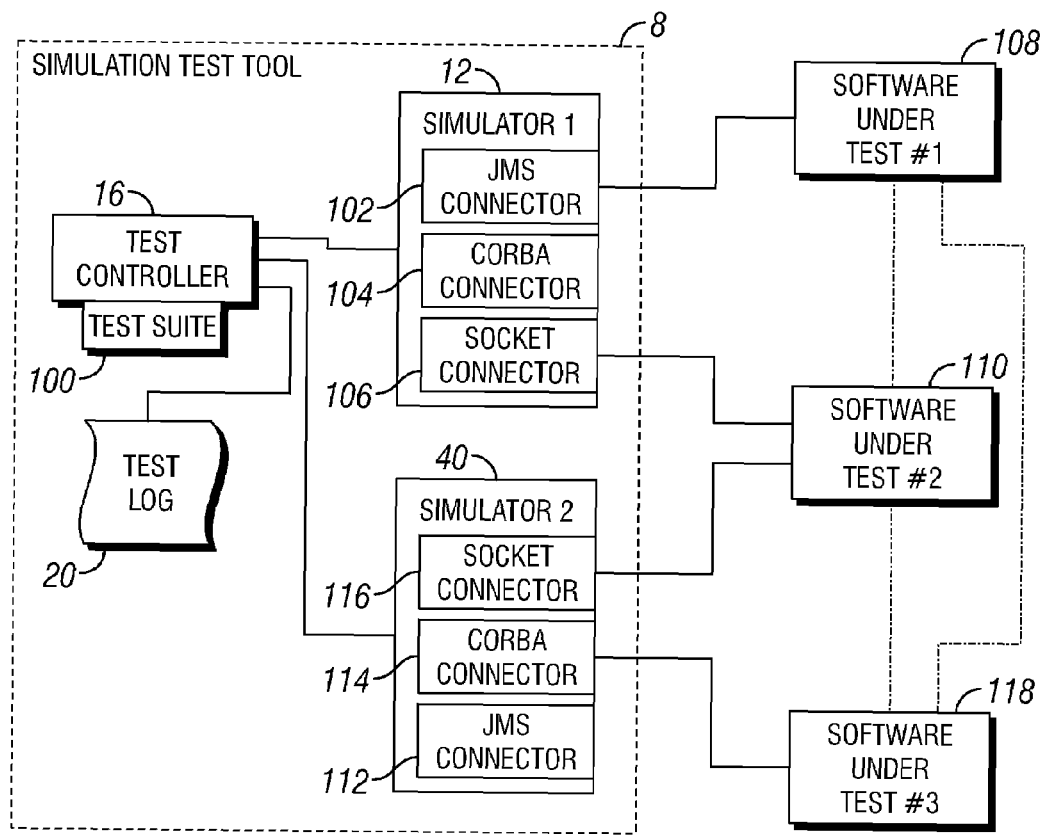
FIG. 5 is a block diagram of another software architecture for implementing the simulation test tool, according to another embodiment of the present disclosure.

In both FIG. 1 and FIG. 2 the SUT 10 is depicted by a single box. In some embodiments the SUT 10 need not be a single software component or a single software module or a single software application. Turning now to FIG. 5 the test controller 16 is shown in communication with simulator 12 and simulator 40. The test controller 16 is prepared to execute test suite 100 comprising a series of messages 18.

Simulator 12 has three connectors: a JMS connector 102, a CORBA connector 104, and a socket connector 106. The JMS connector 102 is employed when the simulator 12 communicates with a first SUT 108. The socket connector 106 is employed when the simulator 12 communicates with a second SUT 110.

Simulator 40 has three connectors: a JMS connector 112, a CORBA connector 114, and a socket connector 116. The CORBA connector 114 is employed when the simulator 40 communicates with a third SUT 118. The socket connector 116 is employed when the simulator 40 communicates with the second SUT 110. In some embodiments the SUT 108, 110, and 118 may also communicate with each other.

The simulation test tool 8 is useful for testing projects and multi-component systems where a number of applications, some of which may communicate with one another, are involved. As an example of this interaction, the SUT 108 is tested by the simulator 12, which prompts SUT 108 to transmit information to SUT 110. Thus, SUT 110 is tested by information received from SUT 108 as well as the simulator 40. In the event the SUT 108 operates incorrectly or otherwise becomes inoperable, an additional simulator, such as simulator 12 or 40 can easily be used to replace the SUT 108, so that testing of SUT 110 and 118 can continue. This example is provided as one illustration of the versatility and flexibility of the simulation test tool 8 to test applications, including but not limited to, application components, interfaces and entire projects.

Figure 6:
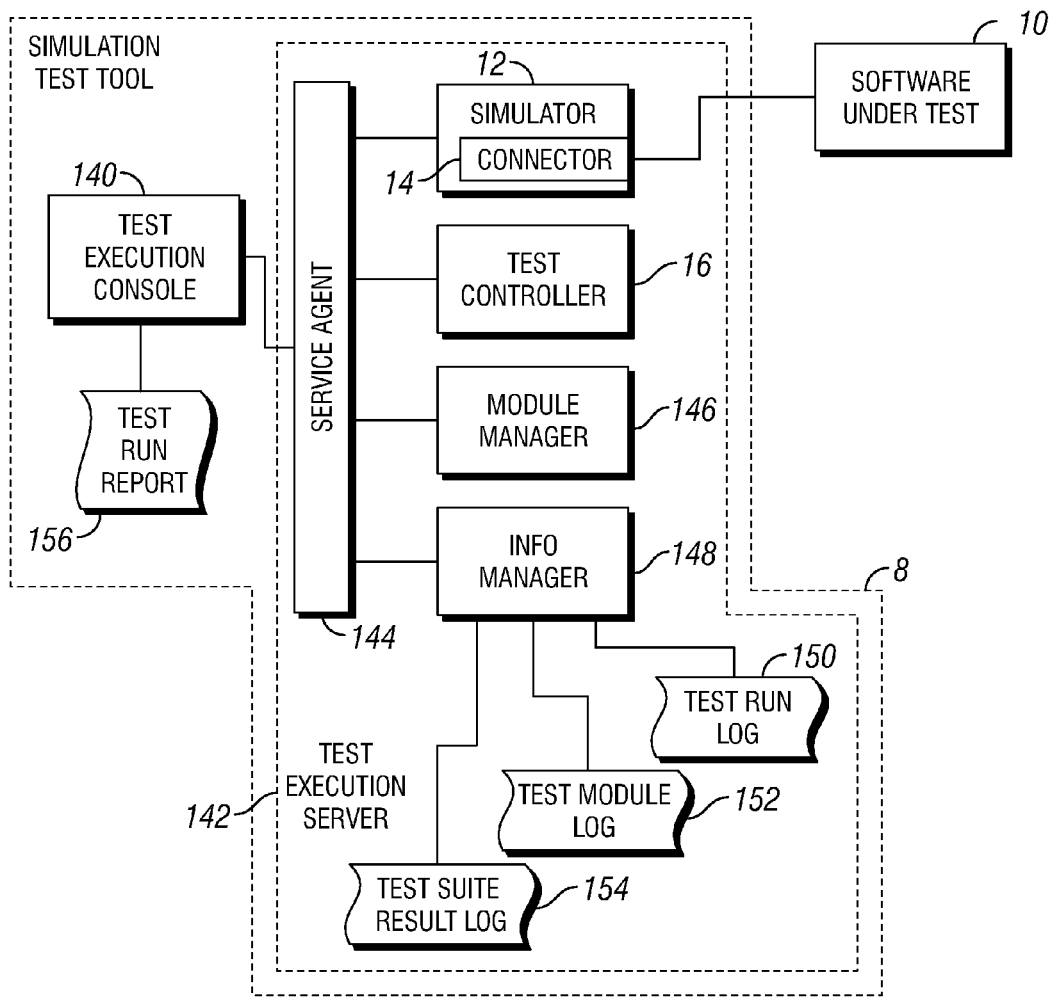
FIG. 6 is a block diagram of the software architecture for implementing the simulation test tool, according to another embodiment of the present disclosure.

In one embodiment additional control and helper software components form a part of the simulation test tool 8. FIG. 6 depicts a client-server embodiment of the simulation test tool 8. A test execution console 140 is a client of the test execution server 142. The test execution server 142 supports a service agent 144, a module manager 146, an information manager 148, the test controller 16, and the simulator 12. The service agent 144 acts as a request and response hub. The test execution console sends requests to the service agent 144, and the service agent 144 sends responses back to the text execution console 140. The service agent 144 also provides for intercommunication among the text execution server 142 components including the simulator 12, the test controller 16, the module manager 146, and the information manager 148. The simulator contains the connector 14. The information manager 148 generates a test run log 150, a test module log 152, and a test suite result log 154. The test execution console 156 persists a test run report 156. The SUT 10 is typically outside of the test execution server 142.

The test execution console 140 functions as the main window to the test execution server 142. It is employed by a user, perhaps a developer or tester, to initiate and abort test runs and to view the test run report 156.

The module manager 146 starts and stops the simulator 12, the test controller 16, the information manager 148, and the service agent 144. In some embodiments, the test execution may stop when an error or exception is detected.

In one embodiment, the information manager 148 captures and persists information produced by the simulator 12, the test controller 16, and the service agent 144 in log files 150, 152, and 154. The test run log 150 records information associated with one or more simulators 12. The information may include inbound messages 18, outbound messages 18, exception records (an example of an exception is when some unexpected condition occurs, usually an error), and processing information. The test run log 150 may be stored in XML format on the test execution server 142. The test module log 152 records information from test execution server 142 modules including the simulators 12, the test controller 16, and the service agent 144. The information may include startup and shutdown sequence, non-test run specific information (such as "heart beat" information for socket communications), and stdout and stderr information. (In the UNIX system processes may read from a standard input file [stdin], write to a standard output file [stdout], and write error information to a standard error file [stderr].) The test module log 152 is stored in free-text format on the test execution server 142. The test suite result log 154 consists of information recording the results of each message 18 which the test controller 16 activates. The result of each message 18 may be passed, failed, skipped, or other status. The test suite result log 154 is stored in XML format on the test execution server 142.

The test execution console 140 may build the test run report 156 from information obtained from the information manager 148. The test run report 156 contains the status of all messages 18 of a test suite 100 (this information may be derived from the test suite result 154) and inbound, outbound, and exception information during test suite execution (derived from the test run log 150). In some embodiments this report may be built by the test execution server 142 and transmitted to the test execution console 140.

Again, while only a single simulator 12 is depicted in FIG. 6, in some embodiments many simulators 12 may be employed. While only a single connector 14 is depicted as part of simulator 12, in some embodiments the simulators 12 may have one or more connectors 14. While only the SUT 10 is depicted, multiple SUT 10 may be tested at once by the simulation test tool 8.

The test execution server 142, the test execution console 140, and the SUT 10 may each execute on their own dedicated general purpose computer system. A general purpose computer system suitable for these purposes is discussed in detail hereinafter.

Only a few topologies for structuring the simulation test tool 8 have been described. For example, the structural relationship between the test controller 16, the simulators 12 & 40 (or other additional simulators). Also, description of the SUT (a single component 10 or multiple components 108, 110, 118, or more). A description has been provided of the additional control and helper components including the test execution console 140, the service agent 144, the module manager 146, and the information module 148. I should be appreciated, however, that other topologies to which the simulator tool 8 may be extended will suggest themselves to one skilled in the art. All of these other topologies are contemplated by this disclosure.

A graphical user interface (GUI) tool is contemplated which a user may employ to construct messages 18 and arrange these messages 18 in series in queues 60. This GUI may permit lifting subsections or slices of existing test cases for reuse in creating new test cases or test suites.

Figure 7:
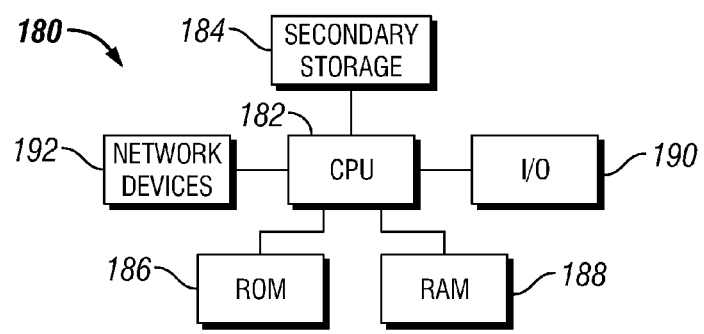
FIG. 7 illustrates an exemplary general purpose computer system suitable for implementing the several embodiments of the simulation test tool.

The software applications described above may be implemented on any general purpose computer with sufficient processing power, memory resources, and network throughput capability to handle the workload placed upon it. FIG. 7 illustrates a typical, general purpose computer system suitable for implementing the present invention. The computer system 180 includes a processor 182 (which may be referred to as a central processor unit or CPU) that is in communication with memory devices including secondary storage 184, read only memory (ROM) 186, random access memory (RAM) 188, input/output (I/O) 190 devices, and network connectivity devices 192. The processor 182 may be implemented as one or more CPU chips.

The secondary storage 184 is typically comprised of one or more disk drives or tape drives and is used for non-volatile storage of data and as an over-flow data storage device if RAM 188 is not large enough to hold all working data. Secondary storage 184 may be used to store programs which are loaded into RAM 188 when such programs are selected for execution. The ROM 186 is used to store instructions and perhaps data which are read during program execution. ROM 186 is a non-volatile memory device which typically has a small memory capacity relative to the larger memory capacity of secondary storage. The RAM 188 is used to store volatile data and perhaps to store instructions. Access to both ROM 186 and RAM 188 is typically faster than to secondary storage 184.

I/O 190 devices may include printers, video monitors, keyboards, mice, track balls, voice recognizers, card readers, paper tape readers, or other well-known input devices. The network connectivity devices 192 may take the form of modems, modem banks, ethernet cards, token ring cards, fiber distributed data interface (FDDI) cards, and other well-known network devices. These network connectivity 192 devices may enable the processor 182 to communicate with an Internet or one or more intranets. With such a network connection, it is contemplated that the processor 182 might receive information from the network, or might output information to the network in the course of performing the above-described method steps. Such information, which is often represented as a sequence of instructions to be executed using processor 182, may be received from and outputted to the network, for example, in the form of a computer data signal embodied in a carrier wave.

The processor 182 executes instructions, codes, computer programs, scripts which it accesses from hard disk, floppy disk, optical disk (these various disk based systems may all be considered secondary storage 184), ROM 186, RAM 188, or the network connectivity devices 192

It can be seen from the above disclosure that the several embodiments described can be employed to support various software testing needs. Repeatability of tests and capturing objective test results derives from the structuring of the test inputs as messages 18. Concurrent testing and stress testing are supported by the several embodiments. Early testing of software under development is supported by the several embodiments, thus increasing the prospects for early detection and repair of software bugs when the repair costs are less than they are later in the development cycle. The employment of connectors 14 reduces the learning curve for testers, again resulting in a cost savings.

While several embodiments have been provided in the present disclosure, it should be understood that the present invention may be embodied in many other specific forms without departing from the spirit or scope of the present invention. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present invention. Other items shown as directly coupled or communicating with each other may be coupled through some interface or device, such that the items may no longer be considered directly coupled to each but may still be in communication with one another. Other examples of changes, substitutions, and alterations are readily ascertainable by on skilled in the art and could be made without departing from the spirit and scope of the present disclosure.

What is claimed is:

1. A method of testing software, comprising:
providing the software;
providing a script to a test controller, wherein the script includes a plurality of messages and each of the plurality of messages has a message component and a data component, wherein the message component of each of the plurality of messages includes an identification of one of a plurality of simulators, wherein the message component of each of the plurality of messages includes a designation of a direction of communication between the one of the plurality of simulators and the software, and wherein the designation of the direction of communication for at least one of the plurality of messages is an inbound direction;
communicating each of the plurality of messages in the script, by the test controllers to the simulator identified in the message component of each of the plurality of messages;
testing the software by the plurality of simulators performing the script, wherein each of the plurality of simulators interact with the software in accordance with the messages communicated by the test controller to simulate an application in communication with the software; and
displaying a result of the testing.

2. The method of claim 1, wherein the message component of each of the plurality of messages further includes an indication of the interaction that the identified simulator performs, wherein the interaction includes waiting to receive a response from the software or transmitting the data component of the message to the software.

3. The method of claim 2, wherein in response to receiving the response from the software, the identified simulator compares the response to the data component of the message and reports a result of the comparison to the test controller, wherein the result of the testing includes the result of the comparison.

4. The method of claim 1, wherein the plurality of simulators concurrently interact with the software to perform the script.

5. The method of claim 4, wherein the plurality of simulators synchronously interact with the software to perform the script.

6. The method of claim 4, wherein the plurality of simulators independently interact with the software to perform the script.

7. A system, having a processor for testing software, comprising:
a test scenario that maintains a set of messages, each message having a script portion and a data portion;
a first simulator that executes the set of messages to simulate an application in communication with the software;
a test controller that obtains the set of messages from the test scenario and communicates the set of messages to the first simulator; and
a tool to develop the script portion of each message in the set of messages and provide the script portion of each message in the set of messages to the test scenario,
wherein the script portion of each message in the set of messages includes a designation of a direction of communication between the first simulator and the software,
wherein the designation of the direction of communication for a first message in the set of messages is an inbound direction, and
wherein the first simulator executes the first message by waiting to receive a response from the software and upon receiving the response from the software, the first simulator compares the response to an expected response included in the data portion of the first message and reports a result of the comparison to the test controller.

8. The system of claim 7, wherein the script portion of each of the set of messages further includes an identification of the first simulator.

9. The system of claim 7, wherein the script portion of a third message in the set of messages includes a delay between execution of, and
wherein the first simulator executes the third message by delaying execution between a message prior to the third message and a message subsequent to the third message in accordance with the delay.

10. The system of claim 7, further comprising:
a second simulator that executes a second set of messages to simulate a second application in communication with the software;
wherein the test scenario further maintains the second set of messages, each message having a script portion and a data portion and
wherein the test controller further obtains the second set of messages from the test scenario and communicates the second set of messages to the second simulator.

11. The system of claim 10, wherein the test controller sequentially communicates each of the messages in the set of messages to the first simulator and sequentially communicates each of the messages in the second set of messages to the second simulator.

12. The system of claim 11, wherein the test controller communicates the set of messages to the first simulator concurrent with communicating the second set of messages to the second simulator.

13. The system of claim 12, wherein the first simulator and the second simulator independently execute the set of messages and the second set of messages respectively.

14. The system of claim 12, wherein the first simulator and the second simulator synchronously execute the set of messages and the second set of messages respectively.

15. The system of claim 10, wherein the script portion of each message in the second set of messages includes an identification of the second simulator.

16. The system of claim 10, wherein the script portion of each message in the second set of messages includes a designation of a direction of communication between the second simulator and the software, and
wherein the designation of the direction of communication between the second simulator and the software is one of the inbound direction or an outbound direction.

17. The system of claim 16, wherein a first portion of the second set of messages designates the inbound direction and a second portion of the second set of messages designates the outbound direction,
wherein the second simulator executes each of the first portion of the second set of messages by waiting to receive a response from the software and upon receiving the response from the software, the second simulator compares the response to an expected response included in the data portion of each of the first portion of the second set of messages and reports a result of the comparison to the test controller, and
wherein the second simulator executes each of the second portion of the second set of messages by communicating the data portion of each of the second portion of the second set of messages to the first simulator.

18. The system of claim 7, wherein the tool develops the set of messages as reusable objects.

19. The system of claim 18, wherein the tool changes the order by which the set of messages are executed without modifying a content of the message.

20. The system of claim 18, wherein the tool adjusts a position of one or more of the set of message in the test scenario and thereby changes the order by which the set of messages are executed.

21. The system of claim 7, wherein the designation of the direction of communication for a second message in the set of messages is an outbound direction, and
wherein the first simulator executes the second message by communicating the data portion of the second message to the first simulator.

22. A system, having a processor, for testing software, comprising:
a test scenario that maintains a plurality of messages, each of the plurality of messages having a script portion and a data portion, wherein the script portion of each of the plurality of messages includes a designation of a direction of communication between a simulator and the software, and wherein the designation of the direction of communication for at least one of the plurality of messages is an inbound direction;

a first simulator to simulate a first application in communication with the software;

a second simulator to simulate a second application in communication with the software;

a test controller that obtains each of the plurality of messages from the test scenario and communicate a first portion of the plurality of messages to the first simulator and communicate a second portion of the plurality of messages to the second simulator; and a tool to develop the plurality of messages and provide the plurality of messages to the test scenario in a manner such that the test controller promotes sequential execution of a the first portion of the plurality of messages by the first simulator and concurrently promotes sequential execution of the second portion of the plurality of messages by the second simulator.

23. The system of claim 22, wherein the tool develops the script portion of the plurality of messages.

24. The system of claim 22, wherein the script portion of each of the plurality of messages includes an identification of the first simulator or the second simulator.

25. The system of claim 24, wherein first portion of the plurality of messages include the identification of the first simulator, and the second portion of the plurality of messages include the identification of the second simulator.

26. The system of claim 22, wherein the script portion of one of the plurality of messages includes a delay between execution of a first message and a second message.

27. The system of claim 22, wherein the tool develops the data portion of the message by associating a data object with the data portion of the message or by receiving test data.

28. The system of claim 27, wherein the first simulator passes the test data to the software.

29. The system of claim 27, wherein the first simulator compares the test data to data received from the software.

30. The system of claim 22, wherein the plurality of messages each include an instruction component and wherein the first simulator receives the first portion of the plurality of messages from the test controller and executes the instruction component simulating the application in communication with the software.

31. The system of claim 22, wherein the tool develops the messages as reusable objects.

32. The system of claim 31, wherein the tool changes the order by which the plurality of messages are executed without modifying a content of the messages.

33. The system of claim 31, wherein the tool adjusts a position of one or more of the plurality of message in the test scenario and thereby changes an order by which the plurality of messages are executed.

34. The system of claim 22, wherein the first simulator and the second simulator independently execute the first portion of the plurality of messages and the second portion of the plurality of messages respectively.

35. The system of claim 22, wherein the first simulator and the second simulator synchronously execute the first portion of the plurality of messages and the second portion of the plurality of messages respectively.

* * * * *